J. E. DAVIDSON.
VALVE.
APPLICATION FILED JULY 23, 1910.

978,706.

Patented Dec. 13, 1910.

2 SHEETS—SHEET 1.

WITNESSES:
H. E. Barry
C. E. Train

INVENTOR
JAMES E. DAVIDSON
BY Munn & Co.
ATTORNEYS

J. E. DAVIDSON.
VALVE.
APPLICATION FILED JULY 23, 1910.

978,706.

Patented Dec. 13, 1910.
2 SHEETS—SHEET 2.

WITNESSES:
F. C. Barry
C. E. Tanner

INVENTOR
James E. Davidson
BY Munn & Co.
ATTORNEYS

UNITED STATES PATENT OFFICE.

JAMES E. DAVIDSON, OF BUTTE, MONTANA.

VALVE.

978,706.

Specification of Letters Patent.   Patented Dec. 13, 1910.

Application filed July 23, 1910.   Serial No. 573,395.

*To all whom it may concern:*

Be it known that I, JAMES E. DAVIDSON, a citizen of the United States, and a resident of Butte, in the county of Silverbow and State of Montana, have invented certain new and useful Improvements in Valves, of which the following is a specification.

My invention is an improvement in valves, and consists in certain novel constructions and combinations of parts, hereinafter described and claimed.

The object of the invention is to provide an operating mechanism for a valve, by means of which the extent of opening of the valve may be nicely regulated, and when at the desired opening the valve may be retained in this position indefinitely.

Figure 1:
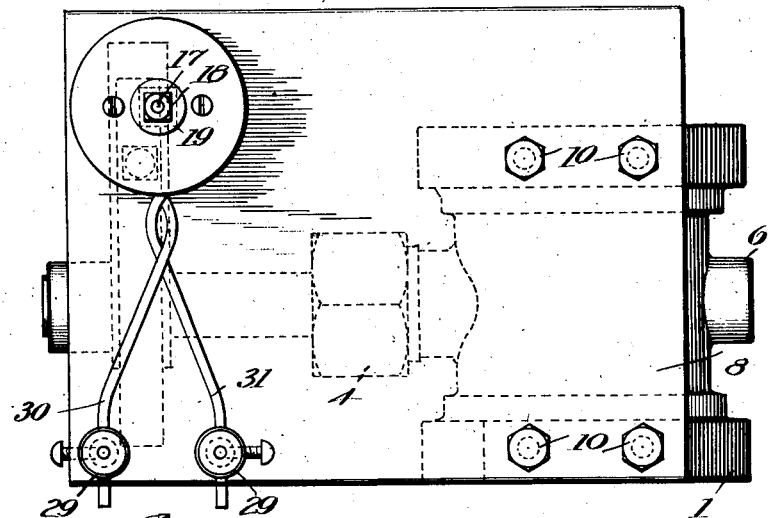
Figure 2:
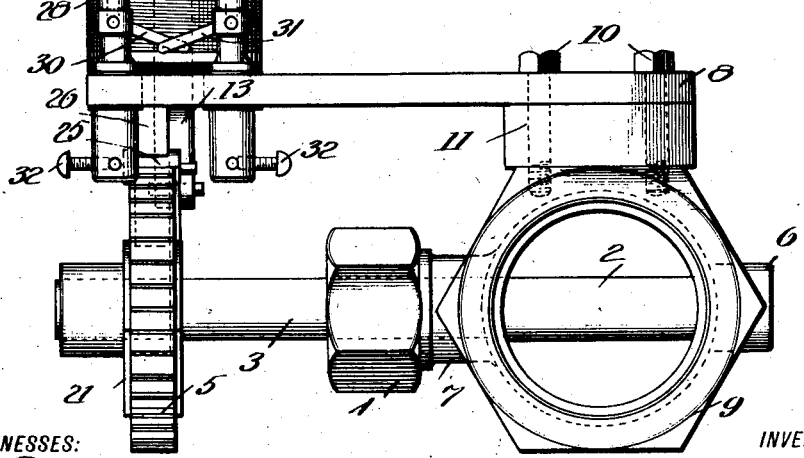
Figure 3:
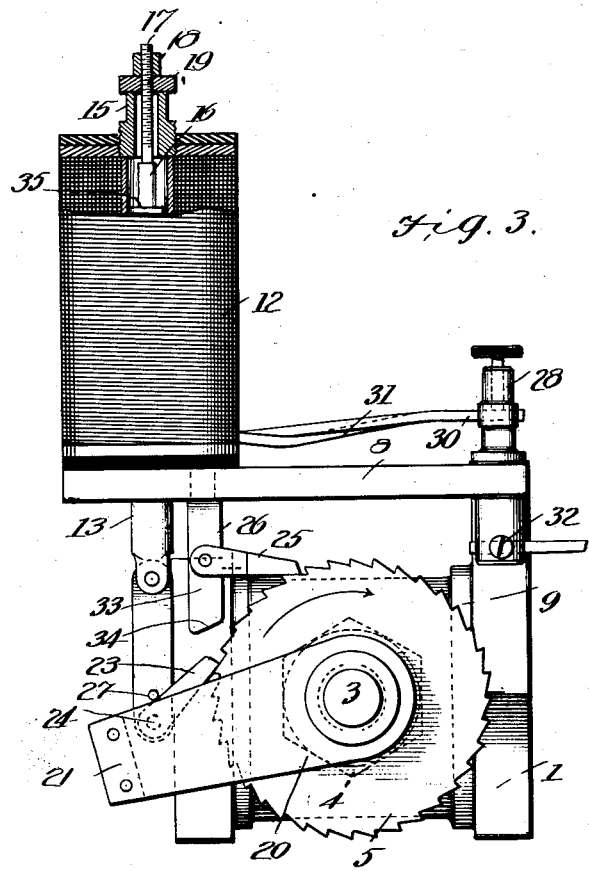
Figure 4:
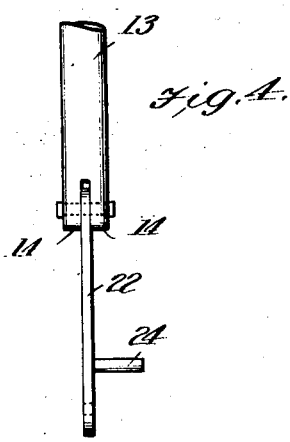

Referring to the drawings forming a part hereof—Figure 1 is a plan view of the improvement, Fig. 2 is a side view, Fig. 3 is a similar view at right angles to Fig. 2, and Fig. 4 is a detail side view of the link.

In the present embodiment of the invention, the valve casing 1 is provided with a rotary valve 2, whose stem 3 extends through a packing nut 4 in the casing wall, and has secured thereto a ratchet wheel 5. The stem 3 is journaled at one end in a bearing 6 in the casing and at the other in a nipple 7 onto which is threaded the packing nut 4.

A plate 8 is secured to a face of the hexagonal flanges 9 at the ends of the casing, by means of cap screws 10, and spacing blocks 11 are interposed between the plate and the flanges, as shown in Fig. 2. The plate extends above the stem 3, of the valve, and at one corner of the plate adjacent to the ratchet wheel 5 a solenoid coil 12 is secured to the plate.

The core 13 of the coil is slidable longitudinally of the coil, and extends below the plate, the lower end of the core being transversely slotted to form a pair of ears 14. A sleeve 15 is threaded into the casing of the solenoid coil at its upper end, and the reduced upper end 16 of the core passes upwardly through the sleeve.

The extremity of the reduced portion of the core is threaded as shown at 17 and nuts 18 and 19 are threaded onto the said extremity, the lowermost nut 19 resting on the upper end of the sleeve. The arms 20 of a yoke 21 are journaled on the outer end of the valve stem, and a link 22 is pivoted at one end between the ears 14 before mentioned.

A pawl 23 is pivoted to the link, the free end of the pawl resting on the ratchet wheel and engaging the same at all times. The pivot pin 24, which connects the pawl with the link is extended and engages the yoke 21, so that the yoke moves with the link. The yoke 21 and the link form the pawl carrier which is journaled on the stem.

A holding pawl 25 is pivoted to a bracket 26 depending from the plate, and engages the ratchet wheel to prevent reverse movement thereof. A pin 27 is arranged above the pawl 23 to prevent displacement thereof. The pin limits the upward movement of the pawl, so that the pawl cannot swing over and out of engagement with the wheel.

A pair of binding posts 28 and 29 are arranged on the plate and lead wires 30 and 31 lead from the respective posts to the coil of the solenoid. Below the plate the posts are provided with the usual perforations for receiving the circuit wires, and with set screws 32 for holding the wires in place.

It will be noticed, from an inspection of Fig. 3, that the bracket 26 is extended below the pawl 25 as at 33, and that the end thereof is beveled at 34 for engagement by the upper edge of the pawl 23. The movement of the pawl is limited by its engagement with the beveled surface to limit the movement of the ratchet wheel and consequently of the valve.

The ratchet teeth are preferably very fine, in order that the engagement of the pawl may take place at an early point in its movement, that is to limit the lost motion as closely as possible. It will be understood that any suitable mechanism may be made use of to control the current to the solenoid.

The operation is as follows: When the current is admitted to the coil of the solenoid, the core is drawn upwardly and the link is lifted. The pawl 23 engages the ratchet wheel turning the same, and partially rotating the stem, to partially open the valve. As soon as the current is shut off the weight of the yoke pulls the core down, the downward movement being limited by the engagement of the nut 19 with the end of the sleeve.

By turning the nuts the extent of the downward movement may be varied. The movement of the stem is repeated until a sufficient amount of fluid is passing through the valve. When the proper amount is passing the valve may be left with the certainty that no more and no less will flow through the valve until it is changed.

To close the valve the stem is rotated until the fluid is shut off, and a suitable indicating mechanism may be used if desired. In practice the operating mechanism may be boxed up in a closed receptacle and operated from a distance if necessary.

A shoulder 35 is formed between the main portion of the core and the reduced portion and the shoulder is adapted to engage the lower end of the sleeve 15 to limit the upward movement of the core.

I claim:

1. The combination with a valve casing, and a valve rotatable therein of a stem for the valve extending through the casing, a ratchet wheel secured to the stem, a plate secured to the casing and extending above the stem, a solenoid coil on the plate, the core of the coil extending below the plate, a yoke having its arms journaled on the stem, one on each side of the ratchet wheel, a link connecting the yoke with the lower end of the core, a driving pawl pivoted to the link and engaging the ratchet wheel, a pin above the pawl for limiting its upward movement, a bracket depending from the plate, a holding pawl pivoted to the bracket and engaging the ratchet wheel, the bracket depending below the holding pawl into position for engagement by the driving pawl near the end of its upward movement, the upper end of the core being reduced and threaded and extending above the core, a shoulder being formed between the reduced portion and the main portion, a nut threaded onto the reduced portion for limiting the downward movement of the core, and a sleeve connected with the coil through which the core extends for engagement by the shoulder to limit the upward movement of the core.

2. The combination with a valve casing, and a valve rotatable therein of a stem for the valve extending through the casing, a ratchet wheel secured to the stem, a plate secured to the casing and extending above the stem, a solenoid coil on the plate, the core of the coil extending below the plate, a yoke having its arms journaled on the stem, one on each side of the ratchet wheel, a link connecting the yoke with the lower end of the core, a driving pawl pivoted to the link and engaging the ratchet wheel, a pin above the pawl for limiting its upward movement, a bracket depending from the plate, a holding pawl pivoted to the bracket and engaging the ratchet wheel, the bracket depending below the holding pawl into position for engagement by the driving pawl near the end of its upward movement, and means for limiting the movement of the core with respect to the coil.

3. The combination with a valve casing, and a valve rotatable therein of a stem for the valve extending through the casing, a ratchet wheel secured to the stem, a plate secured to the casing and extending above the stem, a solenoid coil on the plate, the core of the coil extending below the plate, a yoke having its arms journaled on the stem, one on each side of the ratchet wheel, a link connecting the yoke with the lower end of the core, a driving pawl pivoted to the link and engaging the ratchet wheel, a pin above the pawl for limiting its upward movement, a bracket depending from the plate, and a holding pawl pivoted to the bracket and engaging the ratchet wheel, the bracket depending below the holding pawl into position for engagement by the driving pawl near the end of its upward movement.

4. The combination with a valve casing, and a valve rotatable therein of a stem for the valve extending through the casing, a ratchet wheel secured to the stem, a plate secured to the casing and extending above the stem, a solenoid coil on the plate, the core of the coil extending below the plate, a yoke having its arms journaled on the stem, one on each side of the ratchet wheel, a link connecting the yoke with the lower end of the core, a driving pawl pivoted to the link and engaging the ratchet wheel, a pin above the pawl for limiting its upward movement, a holding pawl for preventing reverse movement of the ratchet wheel, and means for limiting the movement of the core.

5. The combination with a valve casing, and a valve rotatable therein of a stem for the valve extending through the casing, a ratchet wheel secured to the stem, a plate secured to the casing and extending above the stem, a solenoid coil on the plate, the core of the coil extending below the plate, a yoke having its arms journaled on the stem, one on each side of the ratchet wheel, a link connecting the yoke with the lower end of the core, a driving pawl pivoted to the link and engaging the ratchet wheel, a pin above the pawl for limiting its upward movement, and a holding pawl for preventing reverse movement of the ratchet wheel.

6. The combination with a valve casing, and a valve rotatable therein of a stem for the valve extending through the casing, a ratchet wheel secured to the stem, a plate secured to the casing and extending above the stem, a solenoid coil on the plate, the core of the coil extending below the plate, a yoke having its arms journaled on the stem, one on each side of the ratchet wheel, a link connecting the yoke with the lower end of the core, a driving pawl pivoted to the link and engaging the ratchet wheel, and a holding pawl for preventing reverse movement of the ratchet wheel.

JAMES E. DAVIDSON.

Witnesses:
CLIFFORD C. GREEN,
CYRENUS H. SMITH.